May 5, 1970     A. W. LOHMANN     3,510,223
OPTICAL CROSS-CORRELATION AND CONVOLUTION
Filed June 19, 1967
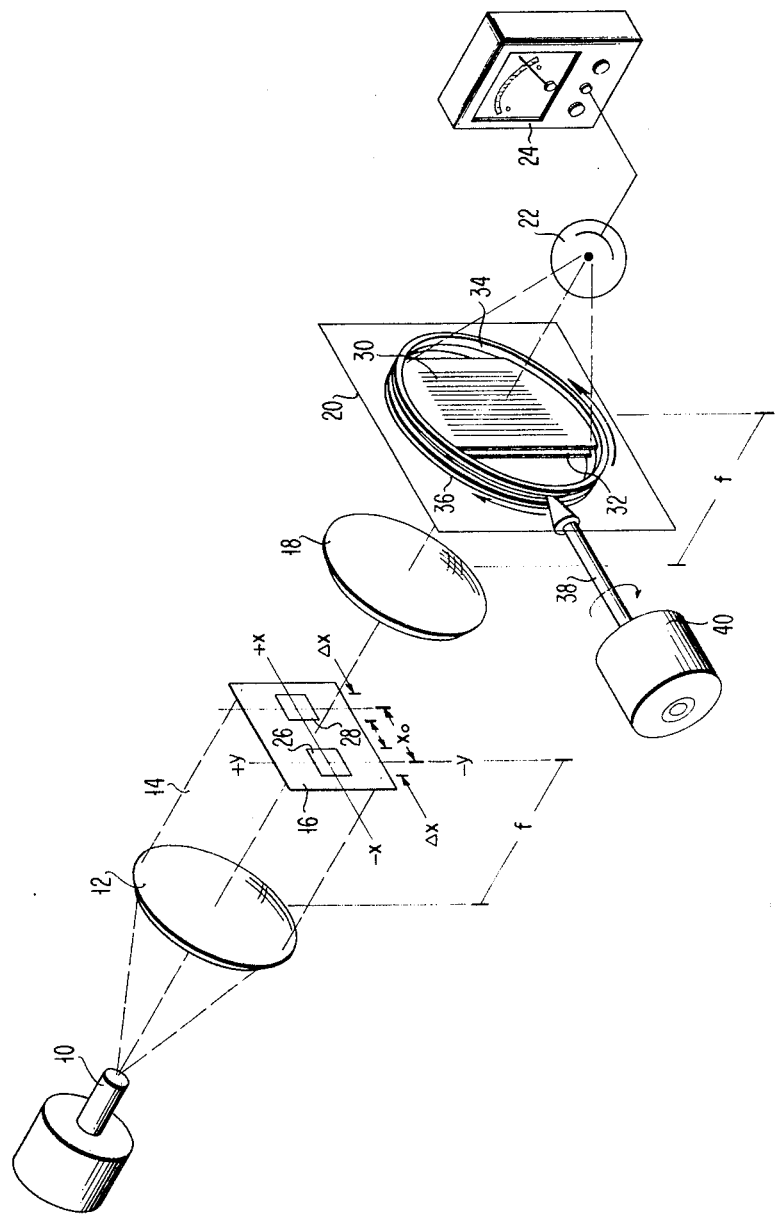
*INVENTOR.*
ADOLF W. LOHMANN
BY *Arthur Decker*
*Attorney*

United States Patent Office 3,510,223
Patented May 5, 1970

3,510,223
OPTICAL CROSS-CORRELATION AND CONVOLUTION
Adolf W. Lohmann, Los Gatos, Calif., assignor to International Business Machines Corporation, Armonk, N.Y., a corporation of New York
Filed June 19, 1967, Ser. No. 646,853
Int. Cl. G02b 27/38; G06h 9/08
U.S. Cl. 356—71                                    11 Claims

ABSTRACT OF THE DISCLOSURE

Optical apparatus in which an object and a reference are Fourier transformed through Fraunhofer diffraction and the combined amplitude of their transformation conveyed through the moire pattern formed by two oppositely-rotating diffraction gratings. The resultant light output is sensed by a photocell, the intensity of which is indicated as maximum if the object and reference are correlated.

---

This invention relates to optical information processing and, more particularly, to optical cross-correlation and convolution wherein an object may be searched for information by comparing its image with that of a standard.

Optical correlation techniques may be regarded as systems which match or compare two areas for common pictorial content. A simple example utilizes a pair of transparencies in contact with each other viewed in the direction of a strong light; when one is shifted, it is observed that maximum light appears through the pair at best registration. A converging lens may be used to focus the transmitted light to a spot on its focal plane in order that the light amplitude be measured by a photocell detector-indicator or other means.

When the two transparencies are spacially separated from each other, maximum light is also transmitted at best registration; further, the lens focal plane presents a bright central area, called the correlation spot, on its optical axis, while the illumination of the remainder of the plane is reduced. When one transparency is shifted laterally, the correlation spot correspondingly shifts in the same direction. When one transparency is rotated, however, the correlation spot becomes blurred; continued rotation causes it to diffuse into the background illumination.

One such correlation technique has been described by A. Vander Lugt, "Signal Detection by Complex Spatial Filtering," IEEE Transactions on Information Theory, April 1964, page 139. In this system, correlation is achieved with two transparencies, one comprising an object and the other comprising the spatial filter of a reference. The two transparencies are placed such that their complex light transmissions are multiplicative. The light output of the system, represents, essentially, the probability that a signal has occurred, i.e., that there is correlation; a bright spot indicates a high probability and diffusion indicates a low probability. This system is very sensitive to the orientation of the transparencies and requires a spatial filter corresponding to the reference, realization of which is quite difficult, since arithmetic division by optical equipment has thus far escaped an easy reduction to practice.

C. S. Weaver and J. W. Goodman, "A Technique for Optically Convolving Two Functions," Applied Optics, vol. 5, No. 7, July 1966, page 1248, presents a technique which seems to avoid the positioning problem. In this system, the two transparencies are placed laterally in the same plane and a piece of film is exposed to illumination through them such that a positive transparency is created; the transmittance of this transparency is proportional to the square of the light amplitude incident on it. This transparceny is then Fourier transformed coincident with radiation of the object plane by a reference beam and observed for the correlation spot. As noted, this system suffers from the disadvantageous requirement, for each convolution, of a photographic step and its requisite delay. J. E. Rau, "Detection of Differences in Real Distribution," J.O.S.A., vol. 56, No. 11, November 1966, p. 1490, describes essentially this same system.

It is thus an object of this invention to provide an optical comparator which does not require precise positioning of components or appreciable delay in its operation or difficulty in readout but which nevertheless provides a positive indication of correlation.

It is another object of this invention to provide an optical comparator which yields information concerning one data distribution with regard to another.

It is still another object of this invention to provide an optical correlator which distinguishes the correlation function from the background (noise) illumination thereby providing an improved means of processing optical information.

It is a general object of this invention to provide an optical system which would form the basis of an optical associative memory.

The foregoing and other objects, features and advantages of the invention will be apparent from the following more particular description of a preferred embodiment of the invention, as illustrated in the accompanying drawing.

In the drawing, point source of monochromatic light 10 is stationed at the optical focus of collimating lens 12, which provides a wavefront of substantially parallel rays. This arrangement is a simple form for generating parallel monochromatic light, i.e., coherent light beam 14, and any other known means for this purpose, such as a laser, will be recognized as suitable by those familiar with this art. Beam 14 is directed through object plane 16 toward converging lens 18, which focuses at image plane 20. Illumination through image plane 20 strikes photocell 22, which, of course, generates an electrical signal corresponding to the light intensity, the amplitude of which signal is indicated by indicator 24. As shown in the preferred arrangement, all components noted above are positioned centrally on axis.

As previously mentioned, the present invention provides means to compare two transparencies, one a reference and the other an object, preferably microfilms of the same dimensions. These are mounted at object plane 16 such that they are equally offset from the axis and displaced at least a distance, $x_0$, typically equal to twice their width, $\Delta x$. Thus, for the center of reference 26 having the coordinates $(x, y)$, the center of object 28 would have the coordinates $(x-2 \Delta x, y)$.

Positioned in image plane 20 is an arrangement for generating moire fringes. This comprises a pair of diffraction gratings 30 and 32 in frames 34 and 36, respectively, supported such that the centers of gratings 30 and 32 are also on the system axis. Shaft 38 of slow speed motor 40, as shown, is in contact with frames 34 and 36 so that energization of motor 40 causes gratings 30 and 32 to revolve about each other, the axis of revolution coincident with their geometrical centers. The resulting transmission through image plane 20 thus is that of a diffraction grating with linearly changing grating interval. The light falling on photocell 22 is thus a measure of how reference 26 and object 28 correlate.

Those trained in the optics and light technologies will appreciate that, if the transmission of reference transparency 26 is represented as $f(x, y)$ and that of object transparency 28 as $g(x-x_0, y)$, then the Fourier transformation by lens 18 provides, at image plane 20, a combined image $$\tilde{U}(\nu_x, \nu_y) = \tilde{f}(\nu_x, \nu_y) + \tilde{g}(\nu_x, \nu_y)e^{-2\pi i\nu_x x_0}$$

The intensity $|U(\nu_x, _{xy})|^2$ falls onto the changing moire pattern generated by counter-rotating gratings 30 and 32. The moirse pattern has a transmission $$M(\nu_{x'}, t) = \sum_{n=0}^{\infty} C_n \cos\{2\pi \text{ nat } (\nu_x - \nu_0)\}$$

Incident on photocell 22 is then a signal $$S(t) = \int\int |\tilde{U}(\nu_x,\nu_y)|^2 M(\nu_x,t) d\nu_x d\nu_y$$

which contains a typical temporally modulated part $$\frac{C_n}{2} e^{\pm 2\pi i \text{ nat}\nu_0} \int\int \tilde{f}(\nu_x, \nu_y) \tilde{g}^*(\nu_x, \nu_y) e^{2\pi i \nu_x x_0} d\nu_x d\nu_y$$

With the coordinate transformation $$x_0 \pm \text{nat} - x' + x'' = -x$$
$$-y' + y'' = -y$$

the integral above $$\int\int f \tilde{g}^* e^{2\pi i\nu_x(x_0 \pm \text{nat})} d\nu_x d\nu_y = \int\int\int\int\int\int f(x',y') g^*(x'')$$
$$e^{2\pi i[\nu_x(x_0 \pm \text{nat}) - (x'\nu_x + y'\nu_y) + (x''\nu_x + y''\nu_y)]} d(\nu_x, \nu_y, x', y', x'', y'')$$

(a Fourier transformation is performed in order to obtain the signal) is transformed into $$\int\int\int\int\int\int f(x', p') g^*(x' - x_0 \pm \text{nat} -$$
$$x, y' - y) e^{-2\pi i(x\nu_x + y\nu_y)} d(\nu_x, \nu_y, x, y, x', y')$$

which is the same as $$\int\int f(x', y') g^*(x' - x_0 \pm \text{nat}, y') dx' dy'$$

From this result we see that correlation is obtained. Further, if $g(x)$ is replaced by $g(-x)$, a convolution is obtained. $f$ and $g$ are $\neq 0$ if $|x| \leq \Delta x/2$. Thus, the correlation $\neq 0$ only when $f$ and $g$ overlap, which occurs when $|-x_0 \pm \text{nat}| \leq \Delta x$. For $n=1$ we will simultaneously have contributions from $fg^* e^+$ and $f^* ge^-$, which means that the output contains the cross-correlation modulated onto a carrier frequency $a\nu_0$. If we write $\phi(x) = A(x)e^{i\varphi(x)}$, we see that the modulus is obtained as the amplitude of the signal and the phase $\varphi$ as its temporal phase, in which $$\phi(x) \triangleq \int\int \tilde{u}(\nu_x,\nu_y) v^*(\nu_x,\nu_y) e^{2\pi i\nu_x x} d\nu_x d\nu_y$$

is the sought correlation function.

While the invention has been particularly shown and described with reference to a preferred embodiment thereof, it will be understood by those skilled in the art that various changes in the form and details may be made therein without departing from the spirit and scope of the invention.

Thus, although the system of the drawing is arranged such that light is transmitted through the various planes and the objects positioned therein, it is apparent that a system utilizing light reflection is also contemplated.

What is claimed is:
1. An optical correlator, comprising:
   a source of collimated radiation;
   a pair of objects to be compared;
   means to position said objects for illumination by the radiation from said source;
   focusing means to focus radiation from said objects at a moire pattern means;
   said moire pattern means providing a changing moire pattern by the continuous counter-rotation of diffraction gratings about an axis of revolution coincident with the geometrical centers of said diffraction gratings, said changing moire pattern being formed in the back focal plane of said focusing means; and
   an indicator responsive to the radiation from said moire pattern.
2. The correlator of claim 1 wherein the radiation from said source is in the visible region of the frequency spectrum.
3. The correlator of claim 2 wherein said objects comprise photographic transparencies.
4. The correlator of claim 3 wherein said positioning means provides separation of said transparencies such that their respective radiations incident at said moire pattern means overlap.
5. The correlator of claim 4 wherein said positioning means provides separation of said transparencies of at least their average length taken in the direction of the separation.
6. The correlator of claim 5 wherein said transparencies are of equal size in the direction of their separation by said positioning means.
7. The correlator of claim 1 wherein said moire pattern means comprises a diffraction grating having a linearly changing grating interval.
8. The correlator of claim 7 wherein said diffraction grating comprises a pair of diffraction gratings in the image plane of said focusing means, each of uniform grating interval, and rotating about each other.
9. The correlator of claim 8 wherein both of said pair of diffraction gratings have the same grating interval.
10. The correlator of claim 1 wherein said focusing means comprises Fourier transformation means.
11. The correlator of claim 10 wherein said Fourior transformation means comprises a lens.

References Cited

UNITED STATES PATENTS 3,104,586   9/1963   Laloe et al. _____ 350—162 X

OTHER REFERENCES

Lohmann, Dispersion Image Formation With Improved Light Throughput, IBM Technical Disclosure Bulletin, vol 7, No. 3, August 1964, pp. 226–227.

Weaver et al., A Technique for Optically Convolving Two Functions, Applied Optics, vol. 5, No. 7, July 1966, pp. 1248–1249.

JOHN K. CORBIN, Primary Examiner

U.S. Cl. X.R.
250—237; 350—162; 356—169